United States Patent [19]

Harris

[11] 4,083,824
[45] Apr. 11, 1978

[54] NON-VINYL SURFACE COVERING COMPOSITION

[75] Inventor: Thomas G. Harris, Lancaster, Pa.

[73] Assignee: Armstrong Cork Company, Lancaster, Pa.

[21] Appl. No.: 789,289

[22] Filed: Apr. 20, 1977

[51] Int. Cl.$^2$ .......................... C08K 3/00; C08K 3/26
[52] U.S. Cl. ............................ 260/42.29; 260/17.4 R; 260/42.52; 260/897 B; 260/998.15; 260/DIG. 31
[58] Field of Search ........ 260/42.52, 897 B, DIG. 31, 260/998.15, 42.29, 17.4 R

[56] References Cited

U.S. PATENT DOCUMENTS

| 3,264,272 | 8/1966 | Rees | 260/78.5 |
| 3,833,708 | 9/1974 | Miller et al. | 260/873 |

*Primary Examiner*—James H. Derrington

[57] ABSTRACT

A non-vinyl flooring composition is described which comprises a mineral filler distributed substantially uniformly throughout a binder comprising a blend of a heteropolymer comprising at least two $C_1$ to $C_8$ linear or branched alkyl acrylates of Mw from about 100,000 to about 300,000 and further characterized by at least two glass transition temperatures, one being above 25° C., the other being below 25° C., and a random ionic copolymer of an α-olefin and an α,β-unsaturated carboxylic acid having 10% to 90% of the carboxylic acid group neutralized with metal ions.

8 Claims, No Drawings

NON-VINYL SURFACE COVERING COMPOSITION

BACKGROUND OF THE INVENTION

1. Field of the Invention

This invention relates to a non-vinyl composition useful as a surface covering material. More particularly, it relates to a floor tile composition comprising a mineral filler and a binder that is a blend of a heteropolymer and an ionomer resin.

2. Description of the Prior Art

A widely used resinous binder material having particular utility in surface coverings is based on those polymers of vinyl chloride, such as the thermoplastic poly(vinyl cloride). When properly compounded with an assortment of plasticizers, heat and light stabilizers, fillers and pigments, the resultant vinyl composition displays satisfactory physical, traffic abrasion and stain resistance properties, such finding particular use as flooring materials. The economics of formulations employing these vinyl polymers particularly favors high filler loadings. However, the cavalier addition of filler materials to the vinyl resin binder is disadvantageous to those commercially important physical properties mentioned above. For example, one of the least expensive filler materials commonly used in vinyl compositions is calcium carbonate. Its sole use in vinyl formulations is generally detrimental to the compounding operation, requiring careful handling at slow speeds on sheet or calendar rolls. Fluidity of the resultant molten mass is generally so high that the melt strength is negligible and proper calendering is all but impossible. Lack of dimensional stability, as exhibited by sheet shrinkage upon removal from the calendar (nerve), is a further problem in these formulations. Of course, many difficulties with the calcium carbonate-only filled compositions can readily be resolved by the use of fibrous fillers, especially asbestos. Compositions containing such filler material display good melt strength, exhibiting the proper degree of viscous flow and melt elasticity, so that they can be readily sheeted, calendered and/or transported without excessive tearing or elongation in the manufacturing process. However, the use of asbestos has recently found a great deal of disfavor since various medical researchers and government officials have suggested that exposure to asbestos fiber-containing products may pose a serious health peril to the general public. At the preset time, many states and municipalities are contemplating or have preliminarily passed legislation to end the use of asbestos in the confines of their jurisdiction. The manufacturing of asbestos-free compositions has, therefore, become a prime goal in the flooring industry.

Additionally, vinyl chloride resins themselves have become subject to health hazard study. The monomer, vinyl chloride, is a noted carcinogen. This, in concert with the recent scarcity of the monomer-forming starting materials, suggests the importance of discovering non-vinyl resin binders.

In U.S. Letters Pat. No. 3,904,579, a novel flooring composition is disclosed that comprises a plasticized vinyl chloride polymer compounded with a terpolymer comprising vinyl chloride/vinyl $C_2$–$C_4$ alkanoate/$C_2$–$C_4$ alkene and filler. While the composition contains no asbestos, the terpolymer comprises at least 75% to 80% of the composition, such containing vinyl chloride. Chlorinated polyethylene is disclosed to be of use in place of, or along with, poly(vinyl chloride) in this formulation. However, the use of such does little to eliminate the use of vinyl chloride in the compounded composition.

Iononic copolymers, generally known as ionomers, are recognized as having unusual properties. However, their use in flooring compositions is severely restricted since they generally have disadvantageously low use temperatures. At normal room temperatures, these copolymers display extensive creep, such accompanied by a rapid decrease in modulus. Further, processing problems using these ionic materials are severe due to their great tenacity for metal surfaces.

SUMMARY OF THE INVENTION

It is, therefore, an object of this invention to provide an improved flooring composition that is non-vinyl.

It is a further object of this invention to provide a non-vinyl flooring composition that has good processing properties.

It is an additional object of the present invention to provide a non-vinyl flooring composition substantially free of asbestos and having good melt strength and ease of processing.

It is a further object of the present invention to provide a non-vinyl, non-fibrous flooring composition possessing the desirable physical properties of vinyl flooring compositions, but having reduced levels of smoke generation.

It is an additional object of the present invention to provide a non-vinyl, non-fibrous flooring composition possessing the desirable properties of fibrous flooring compositions, such as good tensile strength, low moisture absorption, enhanced resistance to traffic staining, and good dimensional stability. These and other objects will become apparent to one skilled in the art from the consideration of the specification.

DESCRIPTION OF THE PREFERRED EMBODIMENTS

In accordance with the present invention, a decorative non-vinyl surface covering is formed by the admixture of a mineral filler, such being substantially uniformly distributed throughout a binder that is a blend of a copoly block acrylate and an ionic copolymer.

The mineral fillers of preference herein are those of a non-fibrous nature such as limestone, whiting, clay, talc, silica, pumice, wood floor, and mixtures thereof. As disclosed earlier, while fibrous fillers are within the scope of the present invention, such do not represent highly desirable fillers. In the preparation of the compositions of the various embodiments herein, filler mixtures of reduced fiber content are preferred. Non-fibrous type filler compositions are particularly useful and limestone represents the most preferred filler, especially limestone comprising very coarse to very fine particle sizes, such having average particle sizes ranging from about 40 to about 340 mesh (Tyler). The amount of filler to be blended with the surface treating composition described below can vary widely and will normally be in the range of from about 60 to about 85 weight percent.

The mineral filler as disclosed above is distributed substantially uniformly throughout a binder system comprising as one ingredient a clear heteropolymer that comprises at least two $C_1$ to $C_8$ linear or branched alkyl acrylates. These heteropolymeric acrylates, sometimes referred to herein as copoly block acrylates, are of molecular weight (Mw) from about 100,000 to about 300,000 and display at least two secondary transition temperatures (Tg), one above room temperature, e.g. 25° C. to 50° C., and one below room temperature (−30° to, but not including, 25° C.). The preparation of these heteropolymers is disclosed in U.S. Pat. No. 3,251,904, filed Nov. 3, 1961, and incorporated herein by reference. Illustrative of the heteropolymers is heteropoly (60% methyl methacrylate/30% ethyl acrylate/10% butylacrylate) of Tg +7°, +72° C., and Mw 131,000 by GPC, as well as heteropoly(50% methyl methacrylate/50% ethyl acrylate) of Tg +3°, +35° C., and Mw 280,000 by GPC.

As a second ingredient to be used herein, it has been ascertained that when 20 weight percent to 80 weight percent of a certain ionic copolymer resin is blended with the above heteropolymeric acrylates, surprising processing, physical and end use properties are imbued to surface covering compositions using these components as binders. The term ionic copolymer resin as used herein is defined as a polymeric substance containing ionized carboxyl groups, such forming ionic cross-links through metal ions in the intermolecular structure of these materials. The ionic copolymers of use in accordance with the present invention are exemplified by those disclosed in U.S. Pat. No. 3,264,272, filed Apr. 8, 1963, incorporated by reference.

The ionic copolymers contemplated of particular use in the compositions herein are those of random character and formed from ethylene and 2.5% to 25% by weight carboxylated monomer (acrylic acid or methacrylic acid), preferably 5% to 20% by weight. In the case of copolymers formed from monocarboxylic acid monomers, the ionic cross-linking agents, e.g. the metals (in the form of metal hydroxides) used to form the ionized carboxyl groups are of valence 1 to 3 such as, for example, sodium, zinc and aluminum, preferably zinc. When copolymers containing the dicarboxylic acid moiety are present, the ionic cross-linking agent is preferably in the form of zinc. While these ionic copolymers can be of any commercially available secondary transition temperature (Tg), the Tg of preference is from −10° to about +10° C. These copolymers are further characterized by a melt index of 0.1 to 1000 grams per minute, preferably 0.5 to 20 grams per minute (ASTM-D-1238-575).

The above-disclosed copoly block acrylate and ionic copolymer are mixed with the mineral filler in the ratios of 8-32:32-8:60 to 3-12:12-3:85, preferably from 8-32:20—20:60 to 3-12:7.5-7.5:85, most preferably 10:10:80. Mixing can be any conventional technique utilized for blending filler with resinous materials. These techniques include the fusing of the composition in the Baker Perkins mixer and sheeting through hot rolls.

In addition to the copoly block acrylate and ionic copolymer binder blend in accordance with the present invention, a wide range of plasticizers can also be incorporated in these compositions. Illustrative plasticizers include esters of aliphatic glycols and aliphatic dicarboxylic acids such as dibutyl sebacate, dioctyl sebacate, dioctyl adipate, didecyl adipate, dioctyl azelate, triethylene glycol di(2-ethylhexanoate), diethylene glycol diperlargonate, triethylene glycol dicaprylate, and the like; esters of aliphatic alcohols and aromatic acids, or aromatic glycols and aliphatic acids, or aromatic alcohols and aromatic acids, including dibutyl phthalate, dicapryl phthalate, dioctyl phthalate, dipropylene glycol dibenzoate, butyl benzyl sebacate, butyl benzyl phthalate, dibenzyl sebacate, dibenzyl phthalate, and the like, are useful herein. Other types of plasticizers such as esters of inorganic acids, including tricresyl phosphate, octyl diphenyl phosphate, and the like, Paraplex G-25 linear polyester or epoxidized soybean oil can also be used. These plasticizers should preferably have low vapor pressure at compounding temperatures, i.e. 400° F. They are employed in plasticizing amounts sufficient to provide mechanical properties which are desirable in the end use applications. Normally, a satisfactory range of plasticizer, including mixtures thereof, is from about 0 weight percent to about 5 weight percent based on the total binder composition.

Small amounts of stabilizers may be incorporated to reduce the effects of degradation of heat and light. Suitable light stabilizers include epoxidized soya bean oil, epoxidized tallates, wood rosin, phosphites, resorcinol disalicylate, resorcinol dibenzoate, phenyl phthalate, phenyl benzoate, ortho-tolyl benzoate, eugenol, and organic phosphates and other complexes of such metals as barium, cadmium, strontium, lead, tin and the like.

Suitable heat stabilizers include barium-cadmium soaps, barium-cadmium-zinc soaps, epoxides, sulfides and sulfites of the metals silver, calcium, cadmium, magnesium, cerium, sodium, strontium and the like. Normally, the novel compositions in accordance with the present invention contain from about 2.5 to about 7.5 weight percent of the above heat and light stabilizers based on total amount of binder. If desired, small amounts of antioxidants such as the hindered phenols, e.g. di-t-butyl-p-cresol, and lubricants such as stearic acid, waxes, and so forth, may be incorporated to obtain further improved calendering and compounding characteristics.

For most purposes, the compositions of this invention are prepared with a pigment. Examples of suitable pigments are titanium dioxide, phthalocyanine blue, phthalocyanine green, chrome yellow, chrome orange, red iron oxide, carbon black, lamp black, chrome oxide green, and the like. The proportion of pigment in the composition varies depending on the type of pigment and may be as low as 0.5% by weight and up to about 5.0% by weight total composition. Inert and extender pigments, such as silica aerogels, talcs, and diatomaceous silica, commonly used in organic coatings are suitable for controlling the gloss of the composition, if desired.

The compositions in accordance with the present invention have tensile strength of from 1800 psi to 3000 psi, displaying greater product durability than vinyl counterparts. They also show enhanced resistance to traffic staining.

The surface covering compositions of this invention are of particular use in the calendering and molding of floor tiles. Such molding can produce tiles of various shapes and sizes including the usual 9 inch × 9 inch tile. The compositions can be molded into sheets and such used to cover large areas of floor surfaces. It is also within the contemplation of the present invention to use the molded sheets for other applications where non-vinyl compositions of superior tensile strength are desired, for example, as covering tables, counters and the like.

In the examples that follow, smoke generated by the illustrative compositions is measured by the method described in "Method for Measuring Smoke From Burning Materials" by D. Gross et al, ASTM Special Technical Bulletin No. 422 (1967). The actual measurements were made on an instrument designated Model 4-5800, Aminco-NBS Smoke Density Chamber, American Instrument Company.

Test samples were made by sheeting the components of the compositions at roll temperatures of about 270°/230° F. The sheets were removed from the mill, allowed to cool, and test samples were then cut from the sheet. Sheets obtained in this manner were approximately 14 inches wide by about 0.060 inches in thickness. Test samples for smoke determinations were cut from the sheets produced in this manner.

In accordance with the test procedure mentioned above, each sample was exposed to an energy flux of 2.5 w/cm$^2$ from a radiant heater under flaming conditions. Flames from a multi-directional propane burner impinged upon the sample and then into the trough at the bottom of the sample.

The sample was exposed until a minimum transmittance value was obtained. After the smoke had been flushed from the cabinet, the residual attenuation of the light beam, caused by deposits on the windows in the test chamber, was recorded and a correction applied to the maximum absorbence value.

Specific optical densities were then normalized with respect to unit surface area of the sample ($D_m$). The specific optical densities are defined by the following expression: $D_m(corr) = V/A'L \times A\ max.\ (corr)$ wear. V equals test chamber volume; L equals optical path length; A' equals surface area of the sample; A max. (corr) equals A max. minus $A_w$, A max. (corr) minus maximum corrected absorbence during the test, A max. minus maximum measured absorbence during the test, $A_w$ minus absorbence caused by deposits on the window.

Examples

Traffic staining in the following illustrative examples is evaluated by exposure to heavy foot traffic for six weeks and examining thereafter both before and after cleaning. Ratings were visual with 1 best, 9 worst before cleaning and after cleaning.

In the illustrative examples, the following components were admixed in the ratios noted.

Ionomer resin: Mole % carboxylic acid monomer, 2.8 mole % as methacrylic acid; % neutralization, 20%; type cationic crosslinker, zinc; melt index, 5.0g/10 minutes.

Copoly block acrylate: (ethyl methacrylate/ethyl acrylate/butyl acrylate) in 60/30/10; Tg +7, +72; $\overline{M}w$ 131,000.

The typical vinyl tile composition of Table II comprise the following: vinyl chloride/vinyl acetate copolymer, $\overline{M}w$ 41,600, and vinyl chloride homopolymer, $\overline{M}w$ 60,000, 11% by weight; coumarone indene resin 2.0% by weight; phthalate plasticizer 4.8% by weight; stabilizer, barium zinc phosphite 0.89% by weight; asbestos, 7R fiber; titanium dioxide 1.0% by weight.

| Comparative-1 | |
|---|---|
| | % by wt. |
| Ionomer (melt index 5.0) | 3.74 |
| Random (ethylene/ethyl acrylate 80:20) copolymer | 14.96 |
| Asbestos | 5.00 |
| Limestone (40M) | 75.30 |
| Titanium Dioxide | 1.00 |
| | 100.00 |

The above was blended on a Baker Perkins mixer to 290° F. and discharged. It was then sheeted on the mill with the rolls set at 270°/230° F. The mix was slightly dry and the roll tack was poor. Tiles were cut from the sheet and press polished (59.0 mils). Physical properties were determined (Table I). EXAMPLE 1

| Example 1 | |
|---|---|
| | % by wt. |
| Ionomer (melt index 5.0) | 8.00 |
| Copoly block acrylate | 8.00 |
| Coumarone indene resin | 2.00 |
| Asbestos | 5.04 |
| Limestone (40M) | 75.95 |
| Titanium Dioxide | 1.01 |
| | 100.00 |

The above was blended in a Baker Perkins mixer to 290° F. (20 minutes) and discharged. It was then sheeted on the mill with the rolls set at 270°/230° F. The mix displayed the desired wetness and roll tack. Tiles were cut from the sheet and press polished (66 mils). Physical properties were determined (Table I).

| Comparative-2 | |
|---|---|
| | % by wt. |
| Random (ethylene/ethyl acrylate 80:20) copolymer | 14.40 |
| Copoly block acrylate | 3.60 |
| Coumarone indene resin | 2.00 |
| Asbestos | 4.92 |
| Limestone | 74.10 |
| Titanium Dioxide | 0.98 |
| | 100.00 |

The above was blended in a Baker Perkins mixer to 290° F. (20 minutes) and discharged. It was then sheeted on the mill with the rolls set at 220°/280° F. The roll tack was poor and the sheet weak. Tiles were cut from the sheet and press polished (63 mils). Physical properties were determined (Table I).

Table I

| | Physical Properties | | |
|---|---|---|---|
| | Comparative-1 | 1 | Comparative-2 |
| Thickness (mils) | 59 | 66 | 63 |
| Specific Gravity | 2.06 | 2.08 | 1.95 |
| Indentation - one minute | 8.4 | 4.2 | 8.6 |
| - ten minutes | 9.1 | 5.0 | 10.0 |
| - thirty seconds (115° F.) | 13.0 | 7.0 | 17.0 |
| Tensile Strength (psi) | 1563 | 2197 | 1080 |
| Elongation (%) | 7.3 | 1.4 | 2.8 |
| Olsen Stiffness (in lbs.) | 3.3 | 5.6 | 2.2 |
| Bend Break Angle (degrees) | 40 | 12 | 29 |
| Moisture Growth (% L) | +0.09 | +0.06 | +0.19 |
| Moisture Absorption (% W) | +0.53 | +0.50 | +0.79 |
| Traffic Rating[1] | 6,(8) | 1,(1) | 9,(9) |

[1]Rating before cleaning 1 best, 9 worst; after cleaning (1) best, (9) worst

The effect on stiffness of increasing the ratio of ionomer to acrylic heterocopolymer (at same binder content) is shown in Table II. All components are as shown in Example 1.

Table II

|  | Ex. 1 | Ex. 2 | Ex. 3 | Typical Vinyl Tile |
|---|---|---|---|---|
| Ionomer:copoly block acrylate | 50:50 | 20:80 | 80:20 | — |
| Thickness (mils) | 66 | 66 | 67 | 63 |
| Specific Gravity | 2.08 | 2.13 | 2.02 | 2.15 |
| Indentation - one minute | 4.2 | 3.2 | 4.7 | 5.7 |
| - 30 secs., 115° F. | 7.0 | 7.0 | 7.0 | 12.0 |
| Tensile Strength (psi) | 2197 | 1830 | 2422 | 899 |
| Elongation (%) | 1.4 | 0.8 | 1.8 | 2.1 |
| Olsen Stiffness (in-lbs) | 5.6 | 4.6 | 6.1 | 1.9 |
| Bend Break Angle (degrees) | 12 | 7 | 13 | 27 |
| Moisture Growth (% L) | +0.06 | +0.02 | −0.04 | 0.16 |
| Moisture Absorption (% W) | +0.50 | +0.72 | +0.30 | +2.31 |
| Dimensional Stability (% L) | −0.12 | −0.01 | −0.17 | −0.11 |
| Dm(corr) Flaming Mode | 48 | 34 | 69 | 164 |

What is claimed is:

1. A non-vinyl surface covering compositions comprising
  (a) a mineral filler distributed substantially uniformly throughout
  (b) a binder comprising the components
    (1) a copoly block acrylate comprising at least two $C_1$ to $C_8$ linear or branched alkyl acrylates of Mw from about 100,000 to about 300,000 and further characterized by at least two glass transition temperatures, one being above 25° C., the other being below 25° C.; and
    (2) a random ionic copolymer comprising ethylene and 2.5% to 25% by weight acrylic acid or methyacrylic acid crosslinked by a monovalent or polyvalent metal ion, said ionic copolymer having a melt index of 0.1 to 1000 grams per minute, wherein the ratio of component (1):component (2):mineral filler is from 8-32:32-8:60 to 3-12:-12-3:85.

2. The composition of claim 1 wherein said component (2) is methacrylic acid and said metal ion is zinc.

3. The composition of claim 1 wherein said mineral filler is calcium carbonate of from about 40 to about 340 mesh (Tyler).

4. A non-vinyl, low-smoke surface covering composition comprising
  (a) 60% to 85% by weight of a non-fibrous filler,
  (b) 40% to 15% by weight of a binder comprising the components
    (1) 20% to 80% by weight based on total binder of a copoly block acrylate comprising at least two $C_1$ to $C_8$ linear or branched alkyl acrylates of Mw from about 100,000 to about 300,000 and further characterized by at least two glass transition temperatures, one being above 25° C., the other being below 25° C., and
    (2) 80% to 20% by weight based on total binder of a random ionic copolymer comprising ethylene and 2.5% to 25% by weight acrylic acid or methacrylic acid crosslinked by a monovalent or polyvalent metal ion, said ionic copolymer having a melt index of 0.1 to 1000 grams per minute.

5. The surface covering composition of claim 4 wherein said non-fibrous filler is calcium carbonate, and said ionic copolymer has a melt index of 0.5 to 20 grams per minute.

6. The surface covering composition defined in claim 5 wherein the particle size of said calcium carbonate is about 40 mesh to about 340 mesh (Tyler).

7. Molded floor tiles from the composition defined in claim 4 having a tensile strength greater than 1800 psi to 3000 psi.

8. The molded floor tiles of claim 4 additionally containing asbestos and said component (2) is 30 to 70 weight percent of said binder.

* * * * *

Disclaimer 4,083,824.—*Thomas G. Harris*, Lancaster, Pa. NON-VINYL SURFACE COVERING COMPOSITION. Patent dated Apr. 11, 1978. Disclaimer filed May 30, 1978, by the assignee, *Armstrong Cork Company*.

Hereby enters this disclaimer to claims 1 to 8 of said patent.

[*Official Gazette July 25, 1978.*]